Patented Mar. 9, 1937

2,073,371

UNITED STATES PATENT OFFICE 2,073,371

ELECTRODE FOR WELDING

Franz R. Hensel, Indianapolis, Ind., assignor to P. R. Mallory & Co., Inc., Indianapolis, Ind., a corporation of Delaware No Drawing. Application July 16, 1936, Serial No. 90,866

4 Claims. (Cl. 219—4)

This invention relates to welding electrodes and more particularly to pressure exerting welding electrodes.

An object of the invention is to produce an improved pressure exerting welding electrode.

Other objects of the invention will be apparent from the following description taken in connection with the appended claims.

The present invention comprises the combination of elements, methods of manufacture, and the product thereof brought out and exemplified in the disclosure hereinafter set forth, the scope of the invention being indicated in the appended claims.

While a preferred embodiment of the invention is described herein, it is contemplated that considerable variation may be made in the method of procedure and the combination of elements without departing from the spirit of the invention.

In the resistance welding of metal parts the usual procedure is to pass an electric current through the parts to produce a local heating effect which results in the welding of the parts together. The current and pressure are usually applied by welding electrodes which are firmly pressed against the parts to be welded and which conduct the electric current to the welding area. Briefly, this is the procedure followed in all forms of resistance welding such as spot welding, seam welding, projection welding and the like.

Since the welding electrodes must conduct electric current and since heating is not generally desired except at the point where welding is to take place, it is desirable that the welding electrodes be of high electrical conductivity. Due to the heating which necessarily takes place at the point of welding, another requirement of a good welding electrode is that it shall be heat resistant, in other words that it shall not soften materially or change its electrical conductivity or other desirable properties at the temperatures developed during welding. It is particularly desirable that the electrodes shall not be softened sufficiently by the heat developed to be deformed by the pressure exerted in the welding operation. Where welding electrodes have been made of pure copper or of certain copper alloys in the past, deleterious mushrooming of the electrodes has frequently taken place resulting in an early destruction of the electrodes thereby requiring replacement.

The present invention contemplates a copper base welding electrode hardened with a small percentage of silver. Such an electrode is suitable for pressure welding operations such as spot welding, seam and projection welding of lapped sheets of metal and electric riveting, which may be considered as a variation of resistance welding.

Heretofore, welding electrodes have been made of pure copper and of copper base alloys containing hardening ingredients. Whereas pure copper has the requisite high electrical conductivity it is so soft that it "mushrooms" excessively in use and therefore pure copper electrodes, where they can be used at all, require frequent replacement. Hardened copper compositions will stand up better but are less efficient due to their lowered electrical conductivity.

Copper base resistance welding electrodes containing 2% to 5% silver have been used quite frequently. These materials have a comparatively high electrical and heat conductivity, and they are hardened by cold working, and also by an aging process. The disadvantage of these electrodes is that they are very difficult to manufacture, because silver segregates very badly during solidification of the alloy. The addition of silver also lowers the melting point of copper alloys, which increases the difficulty in forging and handling in general. Furthermore, silver is a very expensive material, and the addition of silver in such percentage would increase the cost of the material to such a point as to make it prohibitive for most commercial applications.

It has further been found that on a price basis, the performance of this expensive silver copper electrode, does not compare favorably with such materials as copper-cadmium.

It has now been discovered that welding electrodes of good strength and heat resistance and excellent electrical conductivity can be made from copper containing 0.02 to 0.5% silver. In most cases the electrodes can be made with silver contents in the neighborhood of .02 to .1%, and obtain all the beneficial effects of silver, without increasing the cost of the material above that of pure copper.

Tests have shown that with this silver content, the electrical conductivity is not decreased at all, but is in the neighborhood of 97 to 100%.

The annealing temperature after severe cold working is raised, and is in the neighborhood of 350 to 400° C.

An electrode has been prepared of copper containing .06% silver, which was cold worked to a Rockwell B hardness of 60. After annealing for several hours at 350° C. this hardness was not decreased.

On life tests on spot welding tips, it has been found that the new material "mushrooms" much less than pure copper.

In order to test the advantages of the new material life tests were made on spot welding electrodes formed of copper to which a small amount of silver had been added. A chemical analysis showed the copper to contain .05% silver. The hardness of the hard drawn bar was 55 Rockwell B.

The life tests consisted of making a sufficient number of welds on cold rolled steel to "mushroom" the tip area to 225% of its original. The tip was then redressed to the original dimensions. Careful record was kept of the weight of material machined away in redressing and of the change of length. Tips were "mushroomed" to 225% and redressed ten times. The following table shows the average number of spots obtained, the average amount of material machined away per dressing and the calculated number of spots per inch of electrode of the silver bearing copper as compared to pure copper:

|  | Silver bearing copper | Copper |
|---|---|---|
| Number of spots | 950 | 489 |
| Thickness of material machined away in dressing | .025" | .041" |
| Spots per inch of electrode | 38,800 | 11,900 |

This new material can be used either in the deoxidized state, or not completely deoxidized.

Where copper is referred to it is understood that small amounts of other materials may be included as impurities or where they do not materially alter the characteristics of the composition.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A welding electrode formed of an alloy containing 0.02 to 0.5% silver and the balance substantially all copper said electrode being characterized by an electrical conductivity substantially as high as pure copper, a hardness of at least 50 Rockwell B and the ability to retain its hardness at temperatures at least in the order of 300° C.

2. A welding electrode formed of an alloy containing 0.02 to 0.5% silver, the balance copper.

3. A welding electrode formed of an alloy containing 0.02 to 0.1% silver and the balance substantially all copper said electrode being characterized by an electrical conductivity substantially as high as pure copper, a hardness of at least 50 Rockwell B and the ability to retain its hardness at temperatures at least in the order of 300° C.

4. A welding electrode formed of an alloy containing 0.02 to 0.1% silver, the balance copper.

FRANZ R. HENSEL.